Dec. 27, 1949   G. MORRIS   2,492,172
SLING FOR HANDLING AIRCRAFT WINGS
Filed April 15, 1947
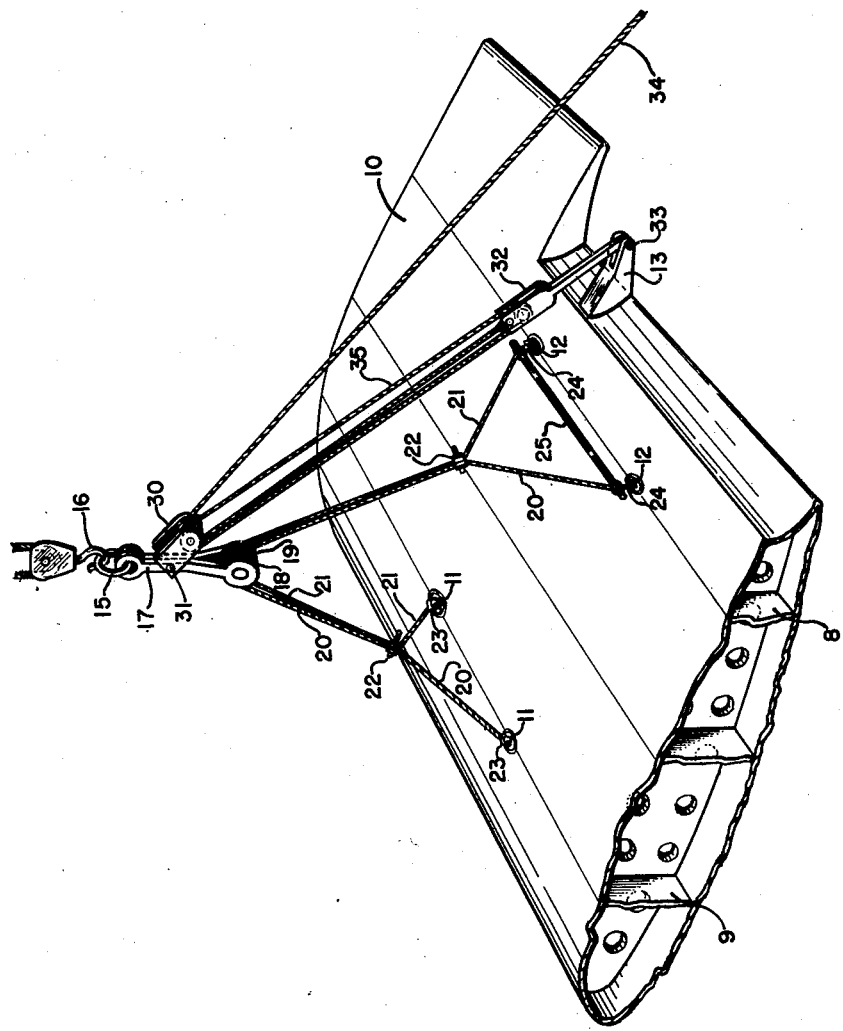
INVENTOR.
GILBERT MORRIS
BY
ATTORNEY Patented Dec. 27, 1949

2,492,172

UNITED STATES PATENT OFFICE 2,492,172

SLING FOR HANDLING AIRCRAFT WINGS

Gilbert Morris, Taunton, Mass.

Application April 15, 1947, Serial No. 741,659

7 Claims. (Cl. 294—74)

(Granted under the act of March 3, 1883, as amended April 30, 1928; 370 O. G. 757)

This invention relates to a servicing sling, and more particularly to a servicing sling used to mount, dismount, and tilt in suspended position the wings of aircraft.

For the proper servicing and maintenance of large present day aircraft, the wings are removed from the airplane and are overhauled independently of the fuselage. An aircraft wing is, by reason of its size and weight, cumbersome to handle, and care must be taken that it is not dropped or severely bumped. Most large airplane wings have lugs attached to the forward and rear main spars to which cables may be attached to lift the wing with a hoist. The existing apparatus for the handling of such wings consists of a pulley block attached to a hoist, and a cable extending over the pulley and attached to four points on the wing. The cables are so arranged that the cables can travel over the pulley a very short distance to permit the alignment of bolt holes on the wing with those in the attaching members on the fuselage.

After the dismounting of the wings, they are stored, leading-edge down, in U-shaped canvas wing racks. Using the existing apparatus, the wing must be lowered by the hoist in a horizontal position onto a platform or horses, tipped by manual handling onto its leading edge, and carried onto the U-shaped rack. Since the wing of a medium-sized transport plane weighs of the order of 750 pounds and is of such shape as to be extremely cumbersome to handle, this operation requires the services of about ten men. The operation takes considerable time and extreme effort and is dangerous to personnel as well as to the wing itself.

The primary object of the present invention is to provide a sling which may be used to pick up an aircraft wing from its place of assembly and lift it to its place on an airplane.

A further object of the present invention is to provide a sling for lifting and tilting an aircraft wing to any desired angle.

A still further object is to provide a sling for an aircraft wing whereby the wing can be turned up on its leading edge and lowered onto a wing rack without detaching the sling.

Further and other objects will become apparent from the description of the accompanying drawing which forms a part of this disclosure. The drawing shows the sling of the present invention as it is used in the handling of an aircraft wing.

A portion of an airplane wing 10 is shown in the drawing with its aileron removed, and a portion of the tip section removed to illustrate the construction of the wing. During manufacture, the wing is provided with means for inserting screw eyes 11 in the leading main spar 9 and screw eyes 12 in the rear main spar 8 of the wing 10. Another convenient point of attachment to the wing is provided by the aileron support bracket 13 at the trailing edge of the wing 10.

The sling itself has a terminal member, ring 15, which provides a convenient attachment to the hook 16 of a hoist. Connected to ring 15 is a pulley block 17, preferably of metal construction to provide the necessary strength. Supported upon this pulley block are two pulleys 18 and 19 mounted side by side. Two flexible cables, 20 and 21, preferably of a durable wire variety, travel over the tops of the pulleys 18 and 19, respectively. Clamps 22 are clamped around the pair of cables as near as possible to the points of attachment to the wing to maintain the cables substantially parallel to each other, thus providing smooth travel of the cables over the pulleys. The forward free ends of cables 20 and 21 are secured by shackles 23 to screw eyes 11, 11, and the rear free ends of cables 20 and 21 are secured to screw eyes 12, 12 by shackles 24, 24. Because of the widely spaced screw eyes 12 in the rear main spar, and the desirability of having the clamp 22 as near the wing as possible, a spreader bar 25 is used in the rear to prevent the breaking of screw eyes 12. Since screw eyes 11, 11 in the forward main spar are narrowly spaced, a spreader bar is not required to prevent bending or breaking of the eyes. Screw eyes 11 and 12 are so located relative to the ends of the wing that the wing is balanced to prevent tipping of the wing endwise. It will now be apparent that when the wing is suspended from a hoist it can be tilted back and forth by travel of cables 20 and 21 over pulleys 18 and 19. By proper location of clamps 22, the wing can be tilted to a vertical position on either its leading or trailing edge.

As previously mentioned, the screw eyes 11 and 12 are so located that the wing will not tip endwise when suspended on the sling. In other words, the pulleys 18 and 19 and the cables 20 and 21 extending over the pulleys, define a vertical plane which includes the center of gravity of the wing. The center of area of the closed polygon connecting the points determined by the screw eyes 11 and 12, however, is not coincident with the center of gravity of the wing, but rather is located toward the leading edge of the wing from the center of gravity. As a consequence, if the wing is freely suspended on cables 20 and 21, the wing will tilt toward its trailing edge. This feature allows for a convenient method of tilting the wing to any desired angle while it is being suspended from a hoist.

The apparatus for tilting the wing includes a second pulley block 30, which is pivotally attached to pulley block 17 by pin 31 and which forms a part of a conventional block and tackle. The other block 32 of the system is pivotally attached to aileron bracket 13 by pin 33. The free end 34 of the ropes 35 included in the system extends beyond the trailing edge of the wing to be in accessible reach of an operator.

If the operator's grip is released on rope 34, the heavy trailing edge of the wing will cause the wing to tip to the rear. By pulling on rope 34, the wing can be caused to tip up on its leading edge with very little effort on the part of the operator. The wing can thus be removed from a plane, tilted up on its leading edge, and set down in a wing rack very easily by two men. A great saving of time and manpower thereby results, and danger to personnel and property is removed. It will also be apparent that a fine tilting adjustment can be achieved by the present apparatus to aid in the alignment of the wing in mounting it back on the plane.

The sling, as described, is adapted for use on wings of a medium-sized transport, but it is to be understood that certain changes and alterations can be made to fit its use to other sizes and shapes of aircraft wings without departing from the spirit and scope of the appended claims.

The invention described herein may be manufactured and used by or for the Government of the United States of America for government purposes without the payment of royalty thereon or therefor.

What is claimed is:

1. A sling for suspending and tilting a member having a plurality of points of support arranged whereby the center of area of a closed polygon connecting said points is not coincident with the center of gravity of said member comprising, a terminal member adapted to be attached to a hoist, a pulley block attached to said terminal member, a first pulley supported upon said pulley block, a pair of cables freely extending over said pulley and having means at the ends thereof for attachment to said points of support of said member, a second pulley supported upon said pulley block, a third cable extending over said second pulley and having means at one end thereof for attachment to said member at a point displaced from said center of area of said polygon in the direction of said center of gravity.

2. A sling for suspending and tilting an aircraft wing having four points of support arranged whereby the center of area of a closed polygon connecting said points is displaced from the center of gravity of said wing in the direction of the leading edge thereof comprising, a terminal member adapted to be attached to a hoist, a first pulley block attached to said terminal member, a pair of pulleys supported upon said first pulley block, a pair of cables freely extending over said pair of pulleys and having means at the ends thereof for attachment to said points of support, a second pulley block secured to said first pulley block, pulley means supported upon said second pulley block, and cable means extending over said pulley means and having means at one end thereof for attachment to the aileron bracket of said wing.

3. A sling for suspending and tilting an aircraft wing having four screw eyes attached thereto and arranged whereby the center of area of the closed polygon connecting said screw eyes is not coincident with the center of gravity of said wing comprising, a terminal member adapted to be attached to a hoist, a pulley block attached to said terminal member, a pair of pulleys supported upon said pulley block, a pair of cables freely extending over said pulleys and having means at the ends thereof for attachment to said screw eyes, and a block and tackle connected between said pulley block and a point on said wing which is displaced from said center of area in the direction of and beyond said center of gravity, whereby said wing can be tilted while being suspended from said terminal member.

4. A sling for suspending and tilting an aircraft wing having four screw eyes attached thereto and arranged whereby the center of area of the closed polygon connecting said screw eyes is displaced from the center of gravity of said wing in the direction of the leading edge thereof comprising, a terminal member adapted to be attached to a hoist, a first pulley block attached to said terminal member, a pair of pulleys supported upon said first pulley block, a pair of cables freely extending over said pair of pulleys and having means at the ends thereof for attachment to said screw eyes, a second pulley block pivotally secured to said first pulley block, pulley means supported upon said second pulley block, and cable means extending over said pulley means and having means at one end thereof for attachment to the trailing edge of said wing, whereby said wing can be tilted while being suspended from said terminal member.

5. A sling for suspending and tilting an object having a plurality of points of support arranged whereby the center of area of a closed polygon connecting said points is not coincident with the center of gravity of said object comprising, a terminal member, first pulley means secured to said terminal member, a pair of flexible supporting members freely extending over said pulley means and having securing means at the ends thereof for attachment to said points of support, a second pulley means secured to said terminal member, a third flexible supporting member extending over said second pulley means and having securing means at one end thereof for attachment to said object at a point displaced from said center of area of said polygon in the direction of said center of gravity.

6. A sling for suspending and tilting an aircraft wing having a plurality of points of support arranged whereby the center of area of a closed polygon connecting said points is not coincident with the center of gravity of said wing comprising, a terminal member, first pulley means secured to said terminal member, a pair of flexible supporting members freely extending over said pulley means and having securing means at the ends thereof for attachment to said points of support, and a block and tackle connected between said terminal member and a point on said wing which is displaced from said center of area in the direction of and beyond said center of gravity, whereby said wing can be tilted while being suspended from said terminal member.

7. A sling for suspending and tilting an object having a plurality of points of support arranged whereby the center of area of a closed polygon connecting said points is not coincident with the center of gravity of said object comprising, a terminal member, pulley means secured to said terminal member, a pair of flexible supporting members freely extending over said pulley means and having securing means at the ends thereof for attachment to said points of support, and a third supporting member of adjustable length being connected at one end to said terminal member and secured at the other end to a point on said object displaced from said center of area of said polygon in the direction of said center of gravity.

GILBERT MORRIS.

REFERENCES CITED

The following references are of record in the file of this patent:

UNITED STATES PATENTS

| Number | Name | Date |
|---|---|---|
| 555,080 | Delaney | Feb. 25, 1896 |
| 2,076,758 | Whiting | Apr. 13, 1937 |
| 2,343,045 | Butler | Feb. 29, 1944 |
| 2,443,202 | Smith | June 15, 1948 |

FOREIGN PATENTS

| Number | Country | Date |
|---|---|---|
| 21,576 | Germany | Apr. 14, 1883 |